INVENTORS
JOHN PEACOCK and
BERNARD HARRIS

Chisholm & Spencer
ATTORNEYS

INVENTORS
JOHN PEACOCK and
BERNARD HARRIS

Chisholm and Spencer
ATTORNEYS

United States Patent Office

3,385,665
Patented May 28, 1968

3,385,665
VAPOR PHASE OXIDATION OF METAL HALIDES TO FORM METAL OXIDES OF PIGMENTARY SIZE AND APPARATUS FOR USE IN ASSOCIATION THEREWITH
John Peacock, Nunthorpe, Middlesbrough, and Bernard Harris, Acklam, Middlesbrough, England, assignors to British Titan Products Company Limited, Durham, England, a corporation of the United Kingdom
Filed Mar. 16, 1965, Ser. No. 440,094
Claims priority, application Great Britain, Mar. 17, 1964, 11,200/64
13 Claims. (Cl. 23—202)

ABSTRACT OF THE DISCLOSURE

The vapor phase reaction between oxidizing gases and metal halides is a desirable process particularly for the production of pigmentary metal oxides such as titanium dioxide. Problems of accretion of the product on the reactor walls and the difficulty of maintaining control of the particle size has severely restricted the use of such processes. These problems can be significantly minimized by employing separate streams of halide vapors and oxidizing gas and causing these streams to intersect in the reactor at an acute angle. The process is particularly adapted for use in the fluidized bed with the streams impinging on each other within the bed.

---

The present invention relates to a process for the production of metal oxides by the oxidation, in the vapour phase, of a metal halide.

A preferred metal oxide is titanium dioxide. The oxidation of a titanium tetrahalide, for example titanium tetrachloride, in a hot fluidised bed of inert particles to produce pigmentary titanium dioxide is known and has been described and claimed, for example, in British Patent No. 761,770.

It is sometimes desirable to produce by such a process very small metal oxide particles, for example titanium dioxide particles which are of a smaller weight median crystal size than is usually considered to be the optimum size for pigmentary titanium dioxide. Thus, it may be desirable to produce particles of titanium dioxide having a weight median crystal size in the range of about 0.05 to 0.22 micron, particularly about 0.1 to 0.19 micron. Particles in these size ranges are of value, for example in the process described and claimed in our British Patent No. 991,318, wherein it is believed that such particles undergo growth to optimum pigmentary size when they are present during the oxidation of more titanium tetrahalide to titanium dioxide under the conditions specified in British Patent No. 991,318.

It is an object of the present invention to provide a process for the production of metal oxide particles, particularly titanium dioxide particles, of controlled particle size.

Acordingly, the present invention is a process for the production of metal oxide (as hereinafter defined) comprising introducing streams of metal halide vapour (as hereinafter defined) and an oxidising gas (as hereinafter defined) separately into a hot fluidised bed through the base of a reactor containing the bed, there being at least one metal halide vapour stream and at least one oxidising gas stream the directions of whose paths as they enter the bed intersect in the bed if projected and whose velocities as they enter the bed are such the two streams impinge upon each other within the bed. The angle formed by the intersection of said directions is preferably less than 90°, and particularly less than 45° (i.e. an acute angle).

The term "metal oxide" includes metalloid oxides such as silica. The preferred metal oxide is titanium dioxide but zirconia, alumina and ferric oxide may also be produced by the oxidation of the corresponding metal halide.

The term "metal halide" includes the chloride, iodide and bromide, but it does not include the fluoride. The chloride is preferred. In the case of titanium the metal halides are normally the tetrachloride, tetraiodide and tetrabromide and, of these, the tetrachloride is preferred.

The term "oxidising gas" includes all gases which will oxidise the metal halide to the metal oxide and which do not have an adverse effect upon the reaction or the reaction products. Examples of possible oxidising gases are oxygen and oxygen-containing mixtures of gases, and oxygen-containing compounds such as water, hydrogen peroxide or oxides of nitrogen. The preferred oxidising gas is oxygen, which may be in admixture with a gas substantially inert to the reaction, as in the case of air.

The particles which constitute the fluidised bed may be of any material of suitable particle size which does not adversely affect the oxidation of the titanium tetrahalide. A preferred particle size is one in the range 50 to 2000 microns, particularly one in the range 100 to 1000 microns. Materials such as silica, alumina, zirconia, zircon sand, titanium dioxide or mixtures thereof have been found suitable.

The bed is normally maintained in a fluidised state by passing the reactants into the bed at a suitable flow rate but, if desired, other gases may also be introduced to assist fluidisation, for example an inert gas such as nitrogen when the oxidising gas is air. The presence of such a gas may, however, dilute the halogen formed during the reaction and complicate its recovery.

The temperatures of the bed should preferably be such as to ensure rapid reaction between the metal halide and the oxidising gas; in the case of titanim tetrahalide, the fluidised bed should be maintained at a temperature in the range of about 800° to 1400° C., preferably 900° to 1300° C.

If the size of the fluidised bed or the amount of reactance reacting in the bed is insufficient to maintain the desired temperatures in the bed, it may be necessary to supply heat to the bed from an external source, for example by burning a fuel gas (such as carbon monoxide or a gaseous hydrocarbon such as propane) in the bed or by preheating one or both of the reactants before introducing them into the bed.

The oxidising gas is preferably introduced in a stoichiometric excess with regard to the halide. If a fuel gas is to be burned in the bed to maintain the desired temperature, then sufficient oxidising gas, particularly oxygen or air, must be introduced to burn the fuel as well as to oxidise the halide.

Each reactant is preferably introduced into the bed through a number of inlets in the base of the reactor.

Desirably, the reactants are so supplied to the inlets and the latter are so constructed that the reactants are evenly distributed in the bed through the appropriate inlets. In order to assist in achieving this, it is preferred that the pressure drop across each inlet is at least half, particularly from 1 to 4 times, that across the bed when fluidised. One way of obtaining the desired pressure drop is the provision of an orifice of restricted and accurately controlled cross section in the inlet.

The velocity of the reactants issuing from the inlets must be sufficient to ensure that the streams of halide and oxidising gas which are directed towards each other will impinge upon each other before being substantially dissipated within the fluidised bed. This required velocity will depend upon the distance which the reactant streams travel through the bed before impinging upon each other and this, in turn, will depend upon the horizontal distance between the streams which are to impinge on each other, at the moment they enter the bed, and upon the angle from the horizontal at which these streams are directed within the bed.

It is also preferred that opposing inlets for the halide and the oxidising gas are so positioned and formed that the distance traversed by the reactant streams within the bed before they impinge upon each other is sufficient to allow the reactants to be heated to reaction temperature, for example to a temperature of at least 800° C.

Horizontal distances between the streams which are to impinge on each other, at the moment they enter the bed, from about ½ inch to about 6 inches have been found convenient in commercial scale reactors, particularly distances from about one to three inches.

The shape and position of the inlets are preferably such that at least one of the reactant streams is introduced in an upwardly inclined, or less preferably in a horizontal direction, for example up to 80° from the horizontal in the former case, but preferably not more than 70°, particularly not more than 60°.

Alternatively, the inlet orifices may, if desired, be formed in the sides of recesses in the base of the reactor and, under these circumstances, the streams of reactants may be directed downwardly at similar angles although this is not a preferred arrangement.

Generally, the velocity at which the reactants issue from the inlets should be at least 5 feet/second and preferably at least 15 feet/second.

It is not necessary in the process of the present invention that inlets for the introduction of *both* reactants into the fluidised bed should be inclined from the vertical. For example, one reactant may be introduced through a vertically directed inlet and the other reactant through an inlet inclined from the vertical in such a manner that the reactant streams impinge upon one another in the bed. Inlets inclined from the vertical may be provided by an angled duct.

If desired, the inlets may be grouped so that one or more inclined inlets direct streams of one reactant into a single stream of the other reactant which may be introduced through an inlet in the form of a vertical passage in the base of the reactor.

The inlets should generally be so positioned and formed that the streams of reactants do not mix and react upon the interior surface of the reactor before impinging upon each other within the bed, otherwise an excessive deposit of coarse titanium dioxide may be formed on the reactor wall and the advantages of the present invention diminished and lost.

The inlets in the base of the reactor may be formed integrally with the base of the reactor, for example as angled ducts within the base which are bent towards the openings of adjacent inlets at an appropriate angle.

Alternatively, they may be formed from tubes having closed ends and perforated walls, the perforations being at an appropriate angle to direct the streams of reactants toward each other but this is not a preferred method of carrying out the present invention.

Another arrangement of inlets for the purpose of the present invention is, as previously noted, the provision of passages for each reactant which terminate in recesses in the base of the reactor, for example on opposing sides of the recesses. Alternatively, a passage of one stream may terminate at the base of a recess and a passage of the other stream may terminate on the side of the recess. Again this is not a preferred arrangement.

The present process may be carried out in the presence of other additions to the fluidised bed. Examples of such additives when the metal oxide is titanium dioxide are aluminium halides such as aluminium trichloride, silicon halides such as silicon tetrachloride, water vapour or a hydrogen-containing gas which is converted to water within the bed, zirconium halides such as zirconium tetrachloride, lower chlorides of titanium such as titanium trihalide, a source of an alkali metal such as potassium, rubidium or caesium, particularly the former (as claimed in our U.S. Patent No. 3,295,921) and/or thorium (as claimed in our U.S. Patent No. 3,228,887 and No. 3,304,265).

It has been found that titanium dioxide particles can be produced by the process of the present invention, having a weight median crystal size below that normally considered to be optimum for pigmentary titanium dioxide. For example, it is generally considered that the optimum weight median crystal size of pigmentary titanium dioxide for use in paints is about 0.25 micron (though smaller particle size material may be desirable for special application, for example in floor tiles and the like). By means of the present invention, particles having a weight median crystal size below about 0.25 micron, particularly below 0.20 micron, may be produced as desired.

The hot gases leaving the bed, consisting mainly of the halogen derived from the halide and possibly excess of one of the reactants, and containing particles of oxide formed in the bed are particularly suitable for supplying to a reaction zone (e.g. an upper zone in the reactor used for the present process) maintained at a temperature of at least about 600° C., preferably at least 800° C., into which additional amounts of a metal halide such as titanium tetrachloride and an oxidising gas are introduced as described in our British Patent No. 991,318. By this means pigmentary titanium dioxide of high tinting strength and very uniform particle size may be obtained.

The drawings accompanying the provisional specification (FIGURE 1 and FIGURE 2) and the present specification (FIGURE 3 and FIGURE 4) illustrate the present invention.

Figure 1:
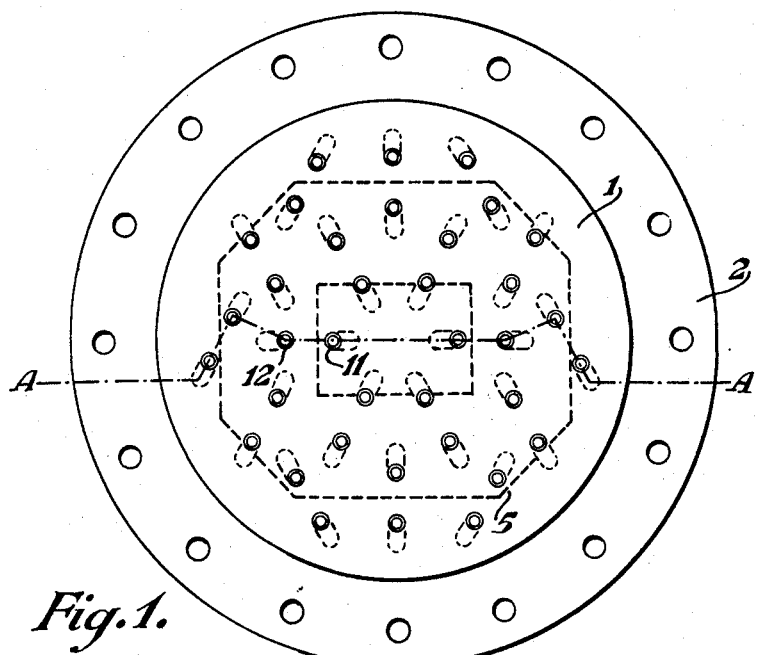
FIGURE 1 is a plan view of the base portion of a shaft furnace reactor.
Figure 2:
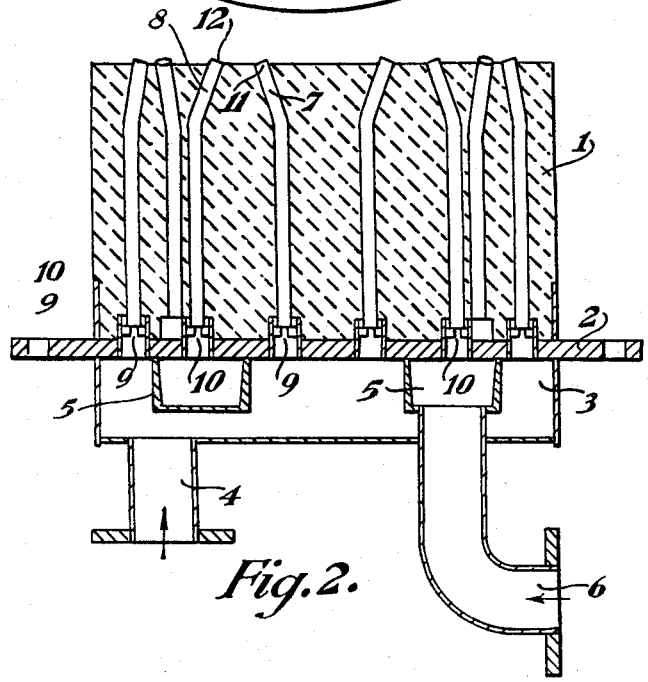
FIGURE 2 is a section of the base along the line A—A of FIGURE 1.

In the apparatus shown in FIGURES 1 and 2, a base plate 1 of refractory material is supported on a metal plate 2. Immediately beneath the metal plate 2 is a wind box 3 having an inlet pipe 4 for admission of one of the reactants. A second wind box 5 shaped like a polygonal annulus is contained within the first wind box 3 and is sealed therefrom. The wind box 5 is provided with an inlet pipe 6 for admission of the other reactant. Inlet passages 7 and 8, formed as angled ducts, pass through the base plate 1 allowing the wind boxes 3 and 5 to communicate with the space above the base plate 1. Inlet passages 7 communicate with the wind box 3 and inlet passages 8 communicate with the wind box 5. Each inlet passage 7 has its angled portion inclined from the vertical towards a correspondingly inclined angled portion of an inlet passage 8. Restricting orifices 9 and 10 are located at the bottom of inlet passages 7 and 8 respectively, to control the flow of the reactants from the wind boxes 3 and 5 into the inlet passages 7 and 8. The inlet passages 7 and 8 have outlets 11 and 12, respectively.

In a specific construction of the apparatus shown in FIGURES 1 and 2, a source of oxygen was connected to inlet pipe 4 and a source of gaseous titanium tetrachloride to inlet pipe 6. Restricting orifices 9 and 10 had diameters 0.166 inch and 0.213 inch, respectively. The distance between adjacent corresponding inlet passages 7 and 8 was about 4½ inches, and the angle formed by the projected axes of the angled portions of such corresponding inlet passages 7 and 8 was about 40°. The horizontal distance between the outlets 11 and 12 of the corresponding inlet passages 7 and 8 was about 2½ inches. The diameter of each inlet passage 7 and 8 was about 0.4 inch. The base plate 1 was 14 inches deep.

Figure 3:
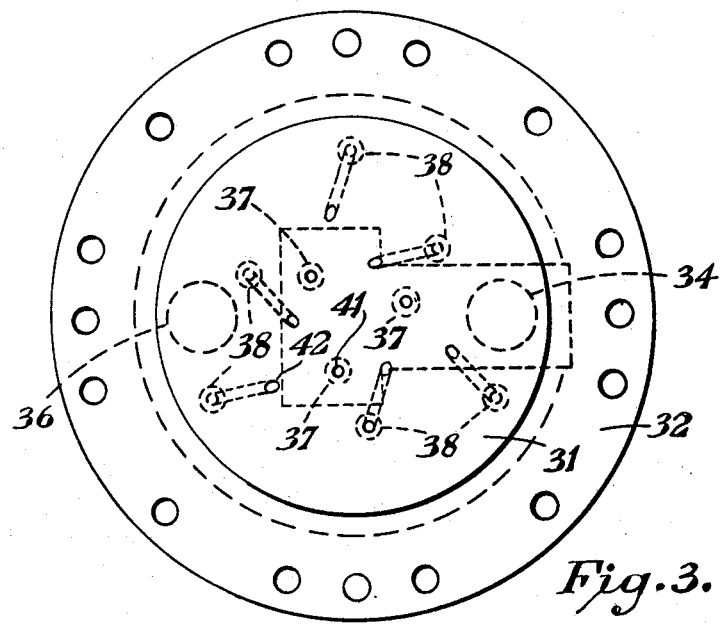
FIGURE 3 is a plan view of the base portion of another reactor.
Figure 4:
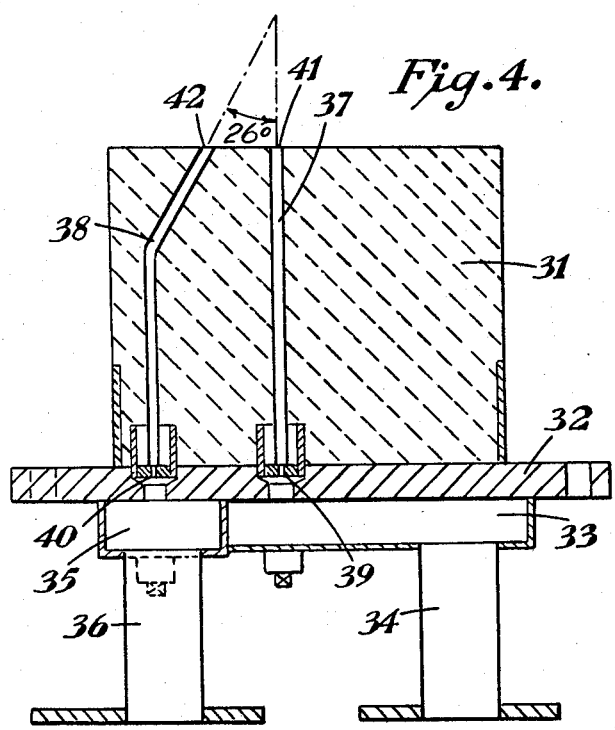
FIGURE 4 is a section of the base along the line B—B of FIGURE 3.

In the apparatus shown in FIGURES 3 and 4, a base plate 31 of refractory material is supported on a metal plate 32. Immediately below the metal plate 32 is a wind box 33 having an inlet pipe 34 for admission of one of the reactants. A second wind box 35, sealed from the wind box 33, has an inlet pipe 36 for admission of the other reactant. Inlet passages 37 and 38 pass through the base plate 31 allowing the wind boxes 33 and 35 to communicate with the space along the base plate 31. Inlet passages 37 communicate with the wind box 33 and inlet passages 38 communicate with the wind box 35. Inlet passages 37 are formed as straight ducts, while inlet passages 38 are formed as angled ducts. Restricting orifices 39 and 40 are located at the bottom of inlet passages 37 and 38 respectively, to control the flow of the reactants from the wind boxes 33 and 35 into the inlet passages 37 and 38. The inlet pasages 37 and 38 have outlets 41 and 42, respectively.

In a specific construction of the apparatus shown in FIGURES 3 and 4, a source of gaseous titanium tetrachloride was connected to inlet pipe 34 and a course of gaseous oxygen to inlet pipe 36. The restricting orifices 39 and 40 had diameters of 9/32 inch and 11/64 inch, respectively. The angle formed by the projected axes of the upper portions of adjacent inlet passages 37 and 38 was about 26° (measured as shown in FIGURE 4). The horizontal distance between adjacent outlets 31 and 32 was about 1¼ inches. The inner diameter of each inlet passage 37 was 13 millimetres, while that of each inlet passage 38 was 10 millimetres. The base plate 31 was 10 inches deep.

The invention is illustrated by the following examples:

Example 1

The reactor (a 3 inch diameter silica tube 48 inches long), had a base plate, and had two silica tubes 3 mm. in diameter projecting into the reactor 1 inch above the base plate. The reactor was set up in an electric furnace.

The furnace was switched on and when the reactor reached a temperature of 1100° C., oxygen was supplied to one silica tube in the base of the reactor at 18 litres/minute and nitrogen to the other at 12 litres/minute.

Sufficient titanium dioxide particles of size range 210 and 350 microns were then poured into the reactor to form a static bed 6 inches in height. This caused the reactor to cool somewhat.

When the reactor had regained a temperature of 1020° C., the supply of nitrogen was stopped and titanium tetrachloride was supplied to one silica tube at a rate equivalent to 55 ml. of liquid titanium tetrachloride per minute, and oxygen was supplied to the other silica tube at a rate of 18 litres/minute. The titanium tetrachloride contained sufficient silicon tetrachloride to provide 0.25% of silica, by weight of the titanium dioxide theoretically formed, and the oxygen contained sufficient aluminum trichloride vapour to provide 3% of alumina, by weight of the titanium dioxide theoretically formed.

The temperature of the bed rose to 1050° and this temperature was maintained during the reaction.

The process described above was carried out using:

(a) Parallel vertical silica tubes, the orifices of which were 1½ inches apart (this was not according to the present invention).
(b) Silica tubes directed towards each other at an angle of 45° from the horizontal and having their orifices 1½ inches apart.
(c) Silica tubes diametrically opposed to each other and having their orifices 1½ inches apart.

The results obtained from the above experiments are shown in the following table.

| Experiments | Weight Median Crystal Size, microns | Rutile Content, Percent |
|---|---|---|
| A | 0.24 | 97.9 |
| B | 0.22 | 98.8 |
| C | 0.19 | 98.5 |

Example 2

The reactor comprised a base portion similar to that shown in FIGURES 1 and 2 and having the specific construction described above. The reactor contained a bed of titanium dioxide particles in the size range 300 to 350 microns. The diameter of the bed was about 24 inches. The bed, fluidised, had a height of about 32 inches above the top of the base plate 1.

The reactor was provided with means for injecting premixed titanium tetrachloride and oxygen, if desired, into the reactor at four levels above the top of the fluidised bed, the lowest of these levels being about 36 inches above the top of the fluidised bed and the other levels being successively 10 inches higher, so that the highest level was about 66 inches above the top of the fluidised bed.

The bed and the reactor walls were preheated to above 1200° C. before the start of the process by means of a gas poker. Then titanium tetrachloride and oxygen, preheated to about 200° C., were introduced into the bed, the former at a rate of 6 lb. moles per hour through inlet pipe 6, wind box 5 and inlet passage 8, and the latter at a rate of 9 lb. moles per hour through inlet pipe 4, wind box 3 and inlet passage 7. Sufficient aluminum trichloride was introduced into the bed to form 2.4% of alumina, by weight of the titanium dioxide formed in the bed.

Throughout the process propane was also introduced into the bed and burnt so as to maintain the temperature within the range 1000 to 1100° C.

The product leaving the top of the fluidised bed consisted of titanium dioxide particles in the rutile form, these particles having a weight median crystal size of about 0.20 micron.

Premixed titanium tetrachloride and oxygen preheated to about 200° C. were then introduced above the fluidised bed at the four levels mentioned above. This preheated mixture contained sufficient silicon tetrachloride to form 0.5% of silica by weight of the titanium dioxide produced above the bed.

The final product consisted of very uniform pigmentary titanium dioxide particles containing 98.2% of rutile and having a weight median crystal size of 0.26 micron. The tinting strength of the product was about 1780 on the Reynolds scale.

Example 3

The reactor comprised a base portion similar to that shown in FIGURES 3 and 4 and having the specific construction described above. The reactor contained a bed of titanium dioxide particles in the size range 300 to 350 microns. The bed, when fluidised, had a height of about 33 inches above the top of the base plate 31.

The reactor was provided with means for injecting premixed titanium tetrachloride and oxygen, if desired, into the reactor at four levels above the top of the fluidised bed, the lowest of these levels being about 27 inches above the top of the fluidised bed and the other levels being successfully 10 inches higher, so that the highest level was about 63 inches above the top of the fluidised bed.

The bed and the reactor walls were preheated to about 1200° C. before the start of the process by means of a gas poker. Titanium tetrachloride and oxygen preheated to about 160° C., were introduced into the bed, the former at a rate of 5 lbs. per minute through inlet pipe 34, wind box 35 and inlet passage 37, and the latter at a rate of 22.5 s.c.f.m. through inlet pipe 36 wind box 35 and inlet passage 38. Nine lbs. per hour of aluminum chloride were introduced with the oxygen.

Propane was introduced into the bed and burnt so as to maintain the temperature at 1150° C.

The product leaving the top of the fluidized bed was titanium dioxide with a rutile content over 98% and a weight median crystal size of 0.19 micron.

Premixed titanium tetrachloride and oxygen were then introduced above the bed at the four levels mentioned above. The titanium tetrachloride was preheated to 250° C. and the oxygen was preheated 140° C. The premixture contained sufficient silicon tetrachloride to form 0.5% of silica by weight of the titanium dioxide formed above the bed.

The final product consisted of very uniform titanium dioxide particles having a weight median crystal size of 0.24 micron and containing at least 98% of rutile. The tinting strength of the product was 1800 on the Reynolds scale.

As a contrast to the above example, the process was repeated with the titanium tetrachloride and oxygen inlet passages through the beds arranged as before except that they were all perpendicular throughout their lengths so that the streams of the two reactants entered the bed in parallel directions. The titanium dioxide particles leaving the top of the bed had a weight median crystal size of 0.26 micron, and the final product had a weight median crystal size of about 0.3 micron.

What is claimed is:

1. A process for producing metal oxide comprising introducing streams of metal halide vapor and oxidizing gas separately and upwardly through the base of a reactor into a contained fluidized bed of inert particles at oxidation reaction temperature, said halide selected from the group consisting of chlorides, bromides and iodides, said separate streams of metal halide and oxidizing gas comprising at least one metal halide vapor stream and at least one oxidizing gas stream introduced into said reactor with projected paths that intersect in the bed at a substantial acute angle and with velocities sufficient to effect impingement between said streams within said bed and reacting said impinging metal halide and oxidizing gas streams substantially completely in said bed to produce metal oxide of controlled fine particle size.

2. A process according to claim 1 in which the acute angle of intersection is less than 45°.

3. A process according to claim 2 in which the distance traveled by the streams within the bed before they impinge on each other is sufficient to allow the streams to be heated by the bed to reaction temperature.

4. A process according to claim 3 in which the horizontal distance between the streams which are to impinge on each other is, at the moment the streams enter the bed, from half an inch to six inches.

5. A process according to claim 4 in which the horizontal distance is from 1 to 3 inches.

6. A process according to claim 5 in which the upward inclination of one of the streams which are to impinge on each other is less than about 80° from the horizontal.

7. A process according to claim 6 in which the upward inclination is less than about 70° from the horizontal.

8. A process according to claim 6 in which the upward inclination is less than about 60° from the horizontal.

9. A process according to claim 2 in which the number of streams of one reactant exceeds the number of streams of the second reactant and in which a plurality of streams of said first-mentioned reactant impinge on a single stream of the second-mentioned reactant within said bed.

10. A process according to claim 1 in which the metal oxide is titanium dioxide and the metal halide is titanium tetrahalide.

11. A process according to claim 10 in which the metal halide is titanium tetrachloride.

12. A process according to claim 2 in which an additional amount of one of said reactants is introduced into the hot gases leaving said fluidized bed before the temperature of such hot gases has fallen below 600° C. whereby additional metal oxide is produced in such hot gases.

13. A process according to claim 12 in which the stated introduction is effected before the stated temperature has fallen below 800° C.

References Cited

UNITED STATES PATENTS

| | | | |
|---|---|---|---|
| 2,823,982 | 2/1958 | Saladin et al. | 23—202 |
| 3,073,712 | 1/1963 | Wigginton | 106—300 |
| 2,560,356 | 7/1951 | Liedholm | 23—1 |
| 2,828,187 | 3/1958 | Evans et al. | 23—202 |
| 2,884,303 | 4/1959 | Metrailer | 23—1 |
| 3,101,249 | 8/1963 | Priscu | 23—287 |
| 3,105,742 | 10/1963 | Allen et al. | 23—202 |
| 3,148,027 | 9/1964 | Richmond | 23—202 |
| 3,188,173 | 6/1965 | Hughes et al. | 23—202 |
| 3,215,496 | 11/1965 | Groves | 23—202 |

OSCAR R. VERTIZ, *Primary Examiner.*

EDWARD STERN, *Examiner.*